Figure 1:
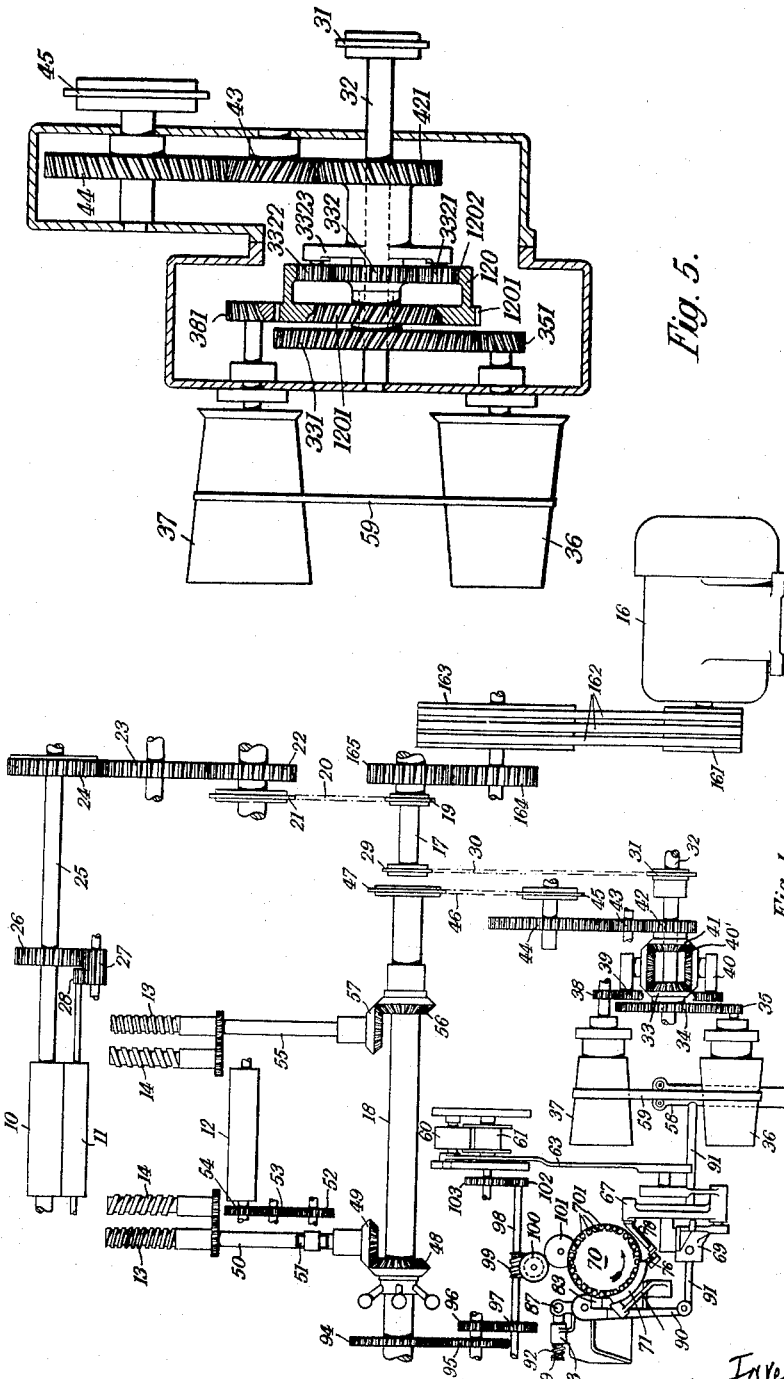

Sept. 21, 1965   J. SPEAK   3,206,803
APPARATUS FOR DETECTING AND CORRECTING IRREGULARITIES
OF THICKNESS OF A TEXTILE SLIVER
Filed Jan. 29, 1963   4 Sheets-Sheet 1

INVENTOR
John Speak
By Noete & Noete
Attorneys

United States Patent Office 3,206,803
Patented Sept. 21, 1965

3,206,803
APPARATUS FOR DETECTING AND CORRECTING IRREGULARITIES OF THICKNESS OF A TEXTILE SLIVER
John Speak, Silsden, near Keighley, England, assignor to Prince-Smith & Stells Limited, Keighley, England, a British company
Filed Jan. 29, 1963, Ser. No. 254,642
Claims priority, application Great Britain, Jan. 29, 1962, 3,314/62
3 Claims. (Cl. 19—241)

The invention is concerned with apparatus for detecting and correcting irregularities of thickness of a textile sliver, such apparatus being of the known type comprising sliver drafting mechanism controlled by the action of a signal-storage relay responsive to sliver thickness irregularities as sensed by a detector associated with the drafting mechanism, a setting element which is responsive to signals issued by the detector and effective to condition said relay by an amount proportional to said signals, cooperating with said relay so as to be motivated thereby to an extent dependent upon its conditioning by the setting element, a variable-speed device arranged to be adjusted by the transmitting element proportionally to the displacement of the latter by the relay, and an operative connection between the driven element of the variable-speed device and the drafting mechanism for regularising the sliver thickness by varying the degree of draft introduced therein by the drafting mechanism.

One of the most simple and most accurate forms of variable speed device which have been proposed for this purpose is the well-known arrangement of two oppositely disposed cone pulleys connected by a traversing belt, but in order to restrict the size of this mechanism it has been necessary to use pulleys having a high surface speed and of relatively short length, with a consequently steep conical angle by which the belt is encouraged to slip diagonally across the pulleys, particularly when traversed at high speed.

It is an object of this invention to provide improvements in the mechanism connecting the variable speed device with the drafting mechanism, providing certain advantages as hereinafter described.

The invention accordingly provides, in apparatus of the aforesaid type, a differential gear unit, means gearing the input gear of said unit to the driving element of the variable speed device and means gearing the driven element thereof to the output gear of said unit, and means connecting said output gear to the drafting mechanism in such fashion that the degree of draft introduced into the sliver is varied proportionally to the variations in the relative speeds of said input and output gears.

The manner in which the invention may be carried into effect is hereinafter described in greater detail with reference to its application to an apparatus of the aforementioned type and constructed in accordance with British patent specifications Nos. 656,135 (corresponding to U.S. Patent No. 2,681,475), 710,957 (corresponding to U.S. Patent No. 3,036,294), 711,501 (corresponding to U.S. Patent No. 2,746,093) and 767,296 (corresponding to U.S. Patent No. 2,891,287) and operating in conjunction with a worsted gill-box, for the purpose of the present invention such apparatus is modified in the following manner.

Figure 2:
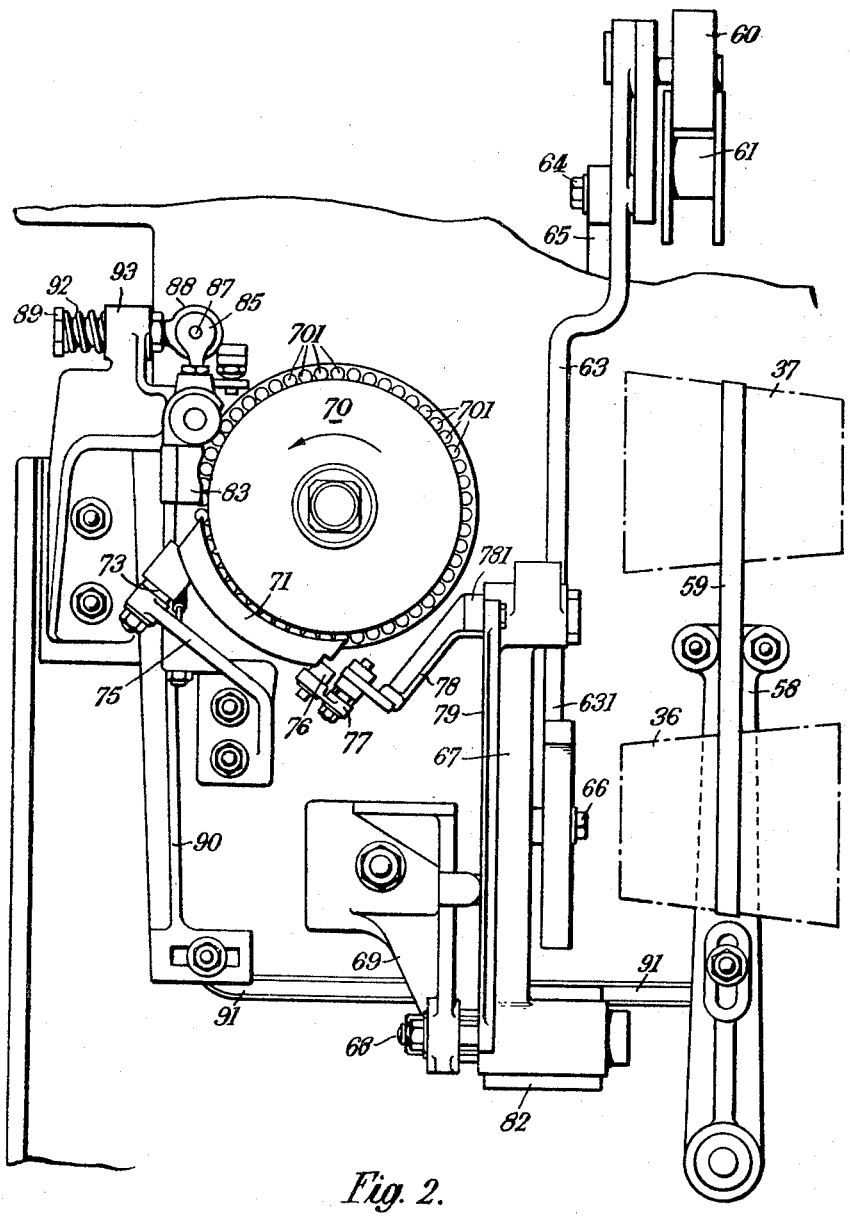
Figure 3:
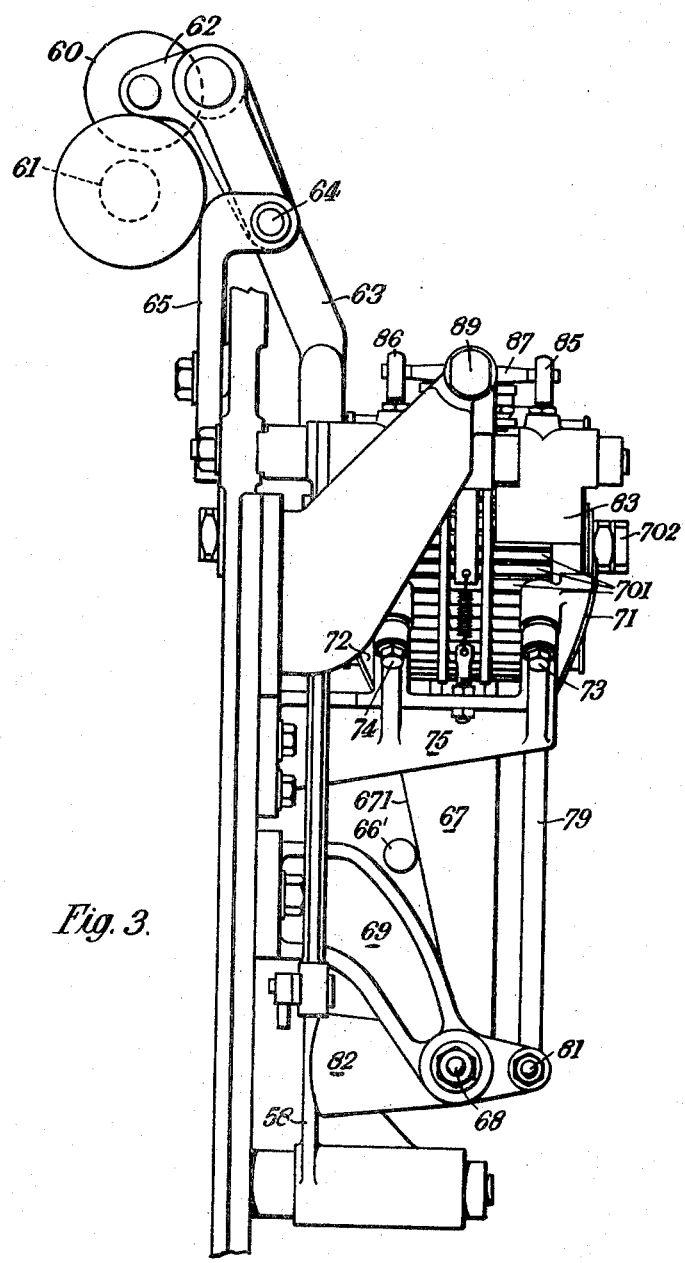
Figure 4:
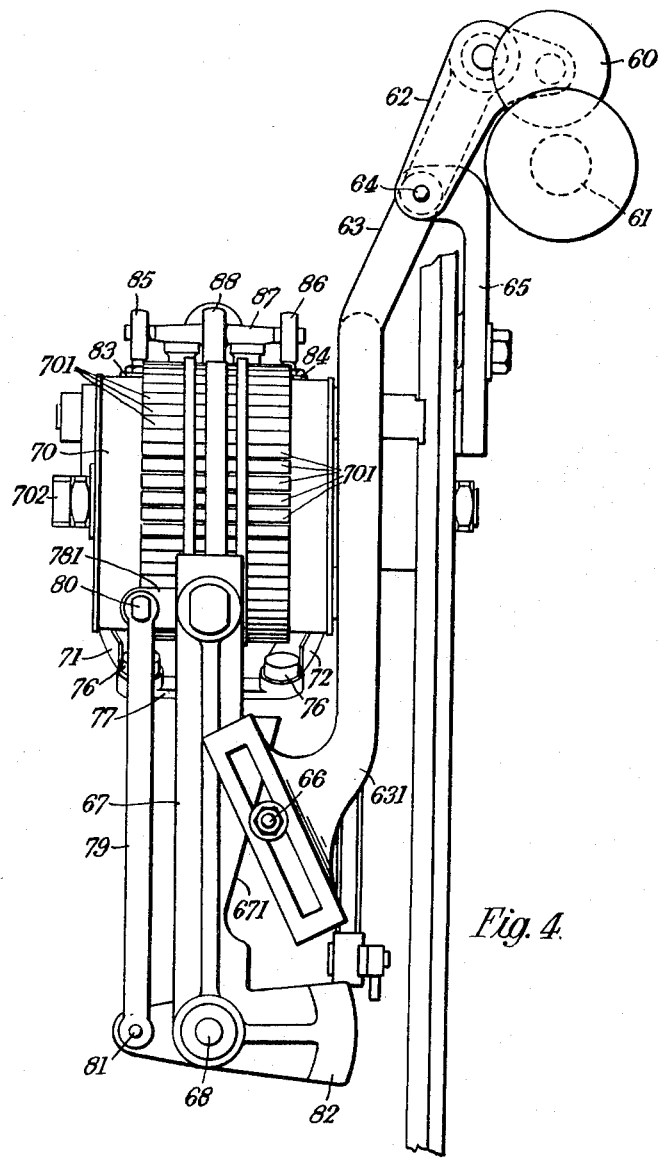

The apparatus is illustrated in the accompanying drawings in which:

FIG. 1 is a schematic diagram showing the several parts of the apparatus and their relationship, FIG. 2 is an elevation of the automatic sliver-thickness correcting mechanism, FIG. 3 is an elevation of said mechanism as viewed from the left-hand side of FIG. 2, FIG. 4 is an elevation of said mechanism as viewed from the right-hand side of FIG. 2, and FIG. 5 is a partially sectional view of an alternative form of the differential gear unit.

The gill-box to which the apparatus of the present invention is applied includes the front drafting rollers 10, 11, back drafting rollers of which only one is shown at 12, and the conventional leadscrews which are used to drive the fallers (not shown), the slow leadscrews being designated by the numerals 13, 13, and the fast leadscrews by the numerals 14, 14. The gill-box drive conveniently powered by an electric motor 16, is taken through the pulley 161, belts 162, pulley 163, and gearing 164, 165, to a counter-shaft 17, which is mounted in axial alignment with the faller drive shaft 18. A gear train including the elements 19, 20, 21, 22, 23, 24 connects said counter-shaft 17 with the front drafting roller shaft 25 to provide a constant speed thereat. The rollers 10, 11 are connected through gears 26, 27 and 28. Chain and sprocket gearing 29, 30, 31 connects said counter-shaft 17 with a shaft 32 bearing the sun wheel 33 of a conventional differential gear unit having planet wheels 40' meshing with wheel 33. Said sun wheel 33 is compounded with a spur gear 34 which is in mesh with a pinion 35 on the shaft of the driving cone pulley 36 of the variable speed device 36, 37. The shaft of the driven cone pulley 37 of said variable speed device carries a pinion 38 meshing with an annular spur wheel 39 on the planet wheel carrier 40 which supports planet wheels 40' of the differential gear unit and the output gear 41, in mesh with wheels 40' and driven differentially by the rotation of said carrier 40 and by the sun wheel 33, is connected by a gear train 42, 43, 44, 45, 46 and 47 with the faller drive shaft 18 from which the back roller 12 of the drafting apparatus derives its motion through the skew gears 48, 49, a worm (not shown) on the shaft 50, a worm-wheel 51 and the gears 52, 53, 54. The shaft 50, and a similar shaft 55 which is driven by the shaft 18 through the skew gears 56, 57, serve to drive the faller leadscrews 13, 14 in known manner.

Variations from the mean position of the guide-fork 58 of the cone pulley driving belt 59 will cause the driven cone pulley 37 and the planet gear carrier 40 associated therewith to revolve at a different speed from the compound input gears 33, 34, associated with the driving cone pulley 36, thus modifying, either by addition or subtraction, the speed of the drive to the back roller 12 and faller drive shaft 18 relative to the speed of the drive to the front rollers 10, 11.

Fluctuations in thickness of the sliver passing through the draw-box are measured by the detector rollers 60 and 61, between the nip of which the sliver is fed in its path towards the back drafting roller 12. The roller 60 is capable of movement towards and away from the roller 61 in accordance with instantaneous variations in the sliver thickness, and such movement is imparted to the setting element of the rod-wheel relay mechanism shown at the lower left-hand corner of FIG. 1 and in greater detail and on a larger scale in FIGS. 2, 3 and 4.

Said roller 60 is rotatably mounted upon an arm 62 of a bell-crank lever 62, 63, which is pivoted at 64 upon a bracket 65, and of which the arm 63 has a downward extension 631 carrying a bowl 66' (FIG. 3) which is mounted on an adjustable stud 66. Said bowl cooperates with an inclined cam-face 671 which forms an integral part of a lever 67 pivoted at 68 upon a fixed bracket 69. The rod-wheel 70, of which the individual rods are marked by the numerals 701, 701, is mounted for rotation about an axis 702, and the axial positions of the rods relative to a datum centre-line is determined by a pair of oppositely disposed curved guide-plates 71 and 72 the quadrantal flanges of which are respectively arranged to bear against the opposite ends of the relay rods 701, the spacing of the guide-plates 71, 72 being sufficiently wide to enable them to receive between them the displaced rods 701 and to guide them by sliding contact with their ends towards a position relative to said datum centre-line of the relay path which is determined by the sliver thickness detector 60, 61. Said plates 71, 72 are respectively mounted on pivots 73, 74 carried by a fixed bracket 75 and their opposite ends are arranged to bear against abutments 76, 76 on a rigid yoke 77 which is suspended from an arm 78 (FIG. 2) pivoted on the upper end of the lever 67. As is apparent from FIGS. 2-4, the plates 71, 72 are inclined downwardly, and it is their bottom free ends which engage the abutments 76, 76. These inwardly curved bottom ends are clearly apparent in FIG. 4. The free bottom ends of the plate 71, 72 remain in engagement with the abutments 76, respectively, either by reason of the force of gravity acting on these plates and tending to swing their bottom ends inwardly toward each other, or any suitable springs may be incorporated into the pivot assemblies 73 and 74, acting on the plates so as to urge their bottom ends inwardly toward each other, and thus the bottom ends will remain in engagement with the abutments 76. A parallel link 79 connected at 80 to an offset 781 of the arm 78 and at 81 to a counterweight 82 mounted on the afore-mentioned pivot 68 which constrains the arm 78 to remain in an upright position irrespective of the attitude of the lever 67. Inasmuch as the turning axes provided by the pivots 73 and 74 at the upper ends of the plates 71 and 72 remain stationary, these upper ends of the plates 71 and 72 will be able to initially receive and center the rods 701, irrespective of the position they have when they enter into the space between the plates 71 and 72 at their upper ends, and it is the location of the bottom ends of the plates 71 and 72 which determine the positions of the rods 701 in accordance with the thickness of the sliver. Therefore, before the rods leave the space between the plates 71 and 72 they are necessarily centralized, and then they are positioned in accordance with the variation in the thickness of the sliver.

Thus, the angular movement of the lever 67 in response to movements of the roller 60 towards and away from the roller 61 is effective, by swinging the guide-plates 71, 72 about their pivots, to perform the dual tasks of centralising the relay rods 701 and of re-setting them in accordance with variations of sliver thickness, in contrast to known apparatus in which said tasks have been performed at two distinct stages in the path of the relay rods; the sensitivity of the present apparatus is superior to that of the known mechanism.

A further distinction between the present improved apparatus and those disclosed in the prior patent specifications hereinbefore referred to is found in the fact that whereas the belt-shift mechanism is actuated in the latter by a single transmitter plate working in conjunction with only one end of each of the relay rods, the arrangement shown in the accompanying drawings employs two such transmitter plates 83 and 84, one cooperating with the rods 701 at one end thereof and the other cooperating with the rods at the other end, said plates 83, 84 being mounted by spherical joints 85, 86 upon the opposite ends of a common rocking link 87 which is supported at its mid-point in a universal bearing 88 carried by a stud 89 capable of endwise movement towards or away from the rod wheel 70. A lever 90 operatively connected to said link 87 is arranged to transmit the movement thereof, as influenced by the cooperation of the plates 83, 84 with the rods 701, through a link 91 to the belt-shifting fork 58, for regulating the ratio of the belt drive between the drums 36, 37 in known manner.

The movement of the stud 89 is controlled by a spring 92 which is compressed between the head of this stud and a fixed abutment 93, the arrangement being such as to avoid any tendency towards jamming of the transmitter due to an excess spreading of the relay rods 701, since the two plates 83, 84 are capable of swinging about their respective universal pivots out of phase, As will be seen from FIG. 1 the rod-wheel 70 is driven from the faller drive shaft 18 through the gear-train 94, 95, 96, 97 the shaft 98, the worm 99, a worm-wheel (not shown) meshing with said worm 99, and the gears 100, 101. The same shaft 98 is used to transmit rotary motion to the bottom detector roller 61 through the gears 102, 103.

FIG. 5 shows an alternative form of differential gear unit in which the cone and belt gearing 36, 37, 59 is subjected to only a fraction of the total driving load. In this case the input shaft 32 has fixed thereon a compound sun-wheel comprising the gears 331, 332. The gear 331 transmits motion to the driving cone drum 36 through the pinion 351, whilst the gear 332 meshes with the planet wheels 3321, 3322 mounted on the planet wheel carrier 3323 which is loose on said shaft 32. Loose on the hub of the compound sun-wheel 331, 332 is an annulus 120 having (a) an external spur gear 1201 meshing with the pinion 381 on the shaft of the driven cone drum 37, and (b) an internal spur gear 1202 which meshes with the planet wheels 3321, 3322. The planet wheel carrier 3323 is integral with an output pinion 421 which drives the sprocket 45 through the gears 43 and 44. The ratios of the several gear trains are such that the drums 36, 37 and belt 59 transmit only a portion of the total driving load, since the output drive from the carrier 3323 is derived from both the sun-wheel 331 and the annulus 120.

By introducing the differential gear unit into the mechanical drive by which the drafting mechanism is regulated by the variable-speed device, it becomes possible to effect a substantial reduction in the conical angle of the cone drums without sacrificing the speed range or increasing the length of the drums. In addition, the rate of adjustment of the variable-speed device may be increased without increasing the wear and load on the transmitting elements and the operative linkage connected thereto.

What I claim as my invention and desire to secure by Letters Patent is:

1. Apparatus for detecting and correcting irregularities of thickness of a textile sliver, comprising sliver-drafting mechanism, measuring means for measuring the variations in the thickness of a sliver processed by said drafting-mechanism and for issuing signals according to said variations, signal-storage relay means, setting means responding to signals issued by said measuring means and conditioning said relay means by an amount proportional to said signals, transmitter means cooperating with said relay means to be displaced thereby to an extent dependent upon its conditioning by said setting means, variable-speed means operatively connected to and adjusted by said transmitter means proportionally to the displacement of the latter, said variable-speed means having a driving element and a driven element, a differential gear unit having an input gear and an output gear, means gearing the input gear of said unit to the driving element of the variable speed means and means gearing the driven element thereof to the output gear of said unit, and means connecting said output gear to the drafting mechanism for providing in the sliver a degree of draft varied proportionally to the variations in the relative speeds of said input and output gears, a pair of gears on said driving and driven elements, respectively, of said variable-speed means, said differential gear unit comprising an input shaft a sun-wheel fast on said input shaft, a spur wheel compounded with said sun-wheel and meshing with said gear on the driving element of the variable-speed means, an annulus loose on the input shaft, an external spur gear on said annulus meshing with said gear on the driven element of the variable-speed device, a planet-wheel carrier rotatable about the input shaft, planet-wheels on said carrier meshing with said sun-wheel, and an internal spur gear on said annulus also meshing with said planet-wheels, said output gear being compounded with said planet-wheel carrier for transmitting the resultant drive to the drafting mechanism.

2. Apparatus for detecting and correcting irregularities of thickness of a textile sliver, comprising sliver-drafting mechanism, measuring means for measuring the variations in the thickness of a sliver processed by said drafting-mechanism and for issuing signals according to said variations, signal-storage relay means, setting means responding to signals issued by said measuring means and conditioning said relay means by an amount proportional to said signals, transmitter means cooperating with said relay means to be displaced thereby to an extent dependent upon its conditioning by said setting means, variable-speed means operatively connected to and adjusted by said transmitter means proportionally to the displacement of the latter, said variable-speed means having a driving element and a driven element, a differential gear unit having an input gear and an output gear, means gearing the input gear of said unit to the driving element of the variable speed means and means gearing the driven element thereof to the output gear of said unit, and means connecting said output gear to the drafting mechanism for providing in the sliver a degree of draft varied proportionally to the variations in the relative speeds of said input and output gears, the signal-storage relay means comprising a wheel carrying a peripheral train of axially-slidable rods adapted for individual displacement by said setting means so as to project beyond a datum central position by an amount proportional to the signals of said measuring means, said setting means including a pair of oppositely disposed curved quadrantal guide-plates spaced apart for receiving between them the relay wheel rods and for guiding the latter by contact with their ends towards a position relative to said datum as determined by said signals, pivot means pivotally mounting said guide-plates on pivots adjacent to the points at which they receive the rods and a link having abutments engaged by the opposite ends of said guide-plates, and measuring means operated linkage means connected to said link to swing the latter, and thus said guide-plates, about their respective pivots to one side or the other of the datum position.

3. Apparatus for detecting and correcting irregularities of thickness of a textile sliver, comprising sliver-drafting mechanism, measuring means for measuring the variations in the thickness of a sliver processed by said drafting-mechanism and for issuing signals according to said variations, signal-storage relay means, setting means responding to signals issued by said measuring means and conditioning said relay means by an amount proportional to said signals, transmitter means cooperating with said relay means to be displaced thereby to an extent dependent upon its conditioning by said setting means, variable-speed means operatively connected to and adjusted by said transmitter means proportionally to the displacement of the latter, said variable-speed means having a driving element and a driven element, a differential gear unit having an input gear and an output gear, means gearing the input gear of said unit to the driving element of the variable speed means and means gearing the driven element thereof to the output gear of said unit, and means connecting said output gear to the drafting mechanism for providing in the sliver a degree of draft varied proportionally to the variations in the relative speeds of said input and output gears, said signal storage relay means comprising a wheel carrying a peripheral train of axially-slidable rods adapted for individual displacement from a datum central position, said transmitting means comprising two plates arranged to cooperate with the respective ends of the rods, a rocking link common to said plates and means mounting said plates with freedom for universal movement upon opposite ends of said common rocking link, a universal bearing supporting said link at an intermediate point and a holder carrying said universal bearing, and means supporting said holder for movement towards or away from said wheel, said variable-speed means having an adjusting member and said holder being mechanically linked to said adjusting member.

References Cited by the Examiner

UNITED STATES PATENTS

| | | | |
|---|---|---|---|
| 1,132,316 | 3/15 | Eves | 19—241 |
| 2,746,093 | 5/56 | Raper | 19—239 |
| 2,978,753 | 4/61 | Mackie | 19—241 |
| 3,026,743 | 3/62 | Curtis | 74—568 |
| 3,087,204 | 4/63 | Catling | 19—240 |

FOREIGN PATENTS

| | | |
|---|---|---|
| 6,199 | 1884 | Great Britain. |
| 7,421 | 1894 | Great Britain. |
| 11,062 | 1888 | Great Britain. |

DONALD W. PARKER, *Primary Examiner.*